US012254163B2

(12) United States Patent
Lukac et al.

(10) Patent No.: US 12,254,163 B2
(45) Date of Patent: Mar. 18, 2025

(54) OBJECT FOLDING TOOL

(71) Applicant: Adobe Inc., San Jose, CA (US)

(72) Inventors: Michal Lukac, San Jose, CA (US);
Amanda Paige Ghassaei, Mountain View, CA (US); Wilmot Wei-Mau Li, Seattle, WA (US); Vidya Narayanan, Pittsburgh, PA (US); Eric Joel Stollnitz, Kirkland, WA (US); Daniel Max Kaufman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 164 days.

(21) Appl. No.: 16/296,047

(22) Filed: Mar. 7, 2019

(65) Prior Publication Data

US 2020/0117338 A1 Apr. 16, 2020

Related U.S. Application Data

(60) Provisional application No. 62/745,641, filed on Oct. 15, 2018.

(51) Int. Cl.
*G06F 3/048* (2013.01)
*G06F 3/04815* (2022.01)
(Continued)

(52) U.S. Cl.
CPC ...... *G06F 3/04815* (2013.01); *G06F 3/04845* (2013.01); *G06F 3/04847* (2013.01);
(Continued)

(58) Field of Classification Search
CPC .. G06F 3/04815; G06F 30/00; G06F 3/04845; G06F 3/0485; G06F 3/04847;
(Continued)

(56) References Cited

U.S. PATENT DOCUMENTS 6,003,664 A 12/1999 Dolan
6,100,893 A 8/2000 Ensz et al.
(Continued)

FOREIGN PATENT DOCUMENTS

CN 108229075 6/2018
CN 104239626 A 11/2020
(Continued)

OTHER PUBLICATIONS

"Pre-Interview First Office Action", U.S. Appl. No. 16/249,427, May 15, 2020, 6 pages.
(Continued)

*Primary Examiner* — Haoshian Shih
(74) *Attorney, Agent, or Firm* — FIG. 1 Patents

(57) ABSTRACT

An object folding tool is leveraged in a digital medium environment. A two-dimensional (2D) representation of an unfolded object is obtained, and visual cues indicating folds for transforming the unfolded object into a folded object are detected. Based on the detected visual cues, a shape of the folded object is determined, and a three-dimensional (3D) representation of the folded object having the determined shape is generated. In one or more implementations, the 2D representation of the unfolded object and the 3D representation of the folded object are displayed concurrently on a display device.

20 Claims, 14 Drawing Sheets

(51) Int. Cl.
  *G06F 3/04845* (2022.01)
  *G06F 3/04847* (2022.01)
  *G06F 3/0485* (2022.01)
  *G06F 30/00* (2020.01)
  *G06T 11/60* (2006.01)
  *G06F 3/0482* (2013.01)

(52) U.S. Cl.
  CPC ............ *G06F 3/0485* (2013.01); *G06F 30/00* (2020.01); *G06T 11/60* (2013.01); *G06F 3/0482* (2013.01); *G06F 2203/04803* (2013.01)

(58) Field of Classification Search
  CPC ......... G06F 3/0482; G06F 2203/04803; G06F 2113/20; G06F 3/04883; G06T 11/60
  See application file for complete search history.

(56) References Cited

U.S. PATENT DOCUMENTS

| | | | |
|---|---|---|---|
| 8,983,646 B1* | 3/2015 | Hanna | G06F 30/00 700/119 |
| 8,994,734 B2 | 3/2015 | Morgana et al. | |
| 9,007,388 B1 | 4/2015 | Cook et al. | |
| 9,654,666 B1 | 5/2017 | Snowball | |
| 9,760,659 B2 | 9/2017 | Eschbach et al. | |
| 11,402,963 B2 | 8/2022 | Ghassaei et al. | |
| 2003/0071810 A1* | 4/2003 | Shoov | G06F 30/00 345/420 |
| 2003/0098862 A1* | 5/2003 | Hunt | G06T 17/00 345/418 |
| 2005/0128211 A1 | 6/2005 | Berger et al. | |
| 2005/0157342 A1 | 7/2005 | Bru | |
| 2007/0055401 A1 | 3/2007 | Van Bael et al. | |
| 2007/0291036 A1* | 12/2007 | McArdle | G06T 19/00 345/441 |
| 2009/0278843 A1* | 11/2009 | Evans | G06T 19/00 345/419 |
| 2009/0282782 A1 | 11/2009 | Walker et al. | |
| 2009/0287717 A1 | 11/2009 | Gombert et al. | |
| 2010/0043354 A1 | 2/2010 | Paltiel et al. | |
| 2011/0054849 A1 | 3/2011 | Walker et al. | |
| 2011/0179383 A1* | 7/2011 | Morris | G06F 3/04842 715/790 |
| 2013/0001236 A1 | 1/2013 | Block | |
| 2013/0120770 A1 | 5/2013 | Mandel et al. | |
| 2014/0040319 A1 | 2/2014 | Morgana et al. | |
| 2014/0379111 A1* | 12/2014 | Rameau | G06F 30/00 700/97 |
| 2015/0314936 A1 | 11/2015 | Stack, Jr. | |
| 2015/0331965 A1 | 11/2015 | Eschbach et al. | |
| 2015/0346977 A1 | 12/2015 | Dubois | |
| 2020/0117337 A1 | 4/2020 | Ghassaei et al. | |

FOREIGN PATENT DOCUMENTS

| | | |
|---|---|---|
| EP | 2120168 | 11/2009 |
| WO | WO-2007028486 | 3/2007 |

OTHER PUBLICATIONS

"First Action Interview Office Action", U.S. Appl. No. 16/249,427, Jun. 19, 2020, 6 pages.
"Combined Search and Examination Report", GB Application No. 1911513.8, Jan. 29, 2020, 5 pages.
"Final Office Action", U.S. Appl. No. 16/249,427, Oct. 5, 2020, 23 pages.
"Foreign Office Action", GB Application No. 1911513.8, Dec. 2, 2020, 3 pages.
"Foreign Office Action", GB Application No. 1911513.8, May 24, 2021, 3 pages.
"Non-Final Office Action", U.S. Appl. No. 16/249,427, May 14, 2021, 33 pages.
"Notice of Allowance", U.S. Appl. No. 16/249,427, Mar. 30, 2022, 16 pages.
201910683778.X , "Foreign Office Action", CN Application No. 201910683778, Mar. 8, 2024, 8 pages.
201910683778.X , "Foreign Notice of Acceptance", CN Application No. 201910683778.X, Sep. 14, 2024, 6 pages.
1 201910683778.X , "Foreign Office Action", CN Application No. 201910683778.X, Sep. 16, 2023, 18 pages.
"Final Office Action", U.S. Appl. No. 16/249,427, Sep. 22, 2021, 29 pages.
"Foreign Office Action", AU Application No. 2019213452, Oct. 29, 2021, 4 pages.
"Foreign Notice of Acceptance", AU Application No. 2019213452, Nov. 22, 2021, 4 pages.

* cited by examiner

1100 —

1102
Detect, by at least one computing device, visual cues of a two-dimensional (2D) representation of an unfolded object, the visual cues indicating folds for transforming the unfolded object into a folded object

1104
Determine, by the at least one computing device, a shape of the folded object based on the detected visual cues

1106
Generate, by the at least one computing device, a three-dimensional (3D) representation of the folded object having the determined shape

*Fig. 11*

OBJECT FOLDING TOOL

RELATED APPLICATION

This Application claims priority under 35 U.S.C. § 119(e) to U.S. Provisional Patent Application No. 62/745,641, filed Oct. 15, 2018 and titled "Object Folding Tool," the entire disclosure of which is hereby incorporated by reference.

BACKGROUND

Creating product packaging designs typically occurs in a 2D context of a package dieline, but these designs are intended to be viewed on a three-dimensional (3D) fabricated package. For instance, conventional systems enable designers to interact with a 2D representation of an unfolded object in order to place graphics for the assembled 3D folded object, e.g., a box, a bag, or an envelope. However, conventional systems are unable to directly determine the 3D shape of the folded object directly from the 2D representation of the unfolded object, and thus are unable to provide a visualization of the 3D folded object. This forces users of conventional systems to visualize how a graphic placed on the 2D representation of the unfolded object will appear on the 3D folded object. Doing so requires extraordinary spatial imagination, especially for objects with a complex shape or when designing graphics which extend across multiple panels of the folded object. This disconnect between the 2D unfolded object and the 3D folded object makes it difficult to accurately place graphics onto the object, restricts the ability of the user to design an aesthetically attractive object, and often results in errors in the final folded object.

SUMMARY

To overcome these problems, an object folding tool is leveraged in a digital medium environment. A two-dimensional (2D) representation of an unfolded object is obtained, and visual cues indicating folds for transforming the unfolded object into a folded object are detected. Based on the detected visual cues, a shape of the folded object is determined, and a three-dimensional (3D) representation of the folded object having the determined shape is generated. In one or more implementations, the 2D representation of the unfolded object and the 3D representation of the folded object are displayed concurrently on a display device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 11 depicts a procedure in an example implementation in which a 3D representation of a folded object having a determined shape is generated from a 2D representation of a corresponding unfolded object.

DETAILED DESCRIPTION

Overview

Figure 1:
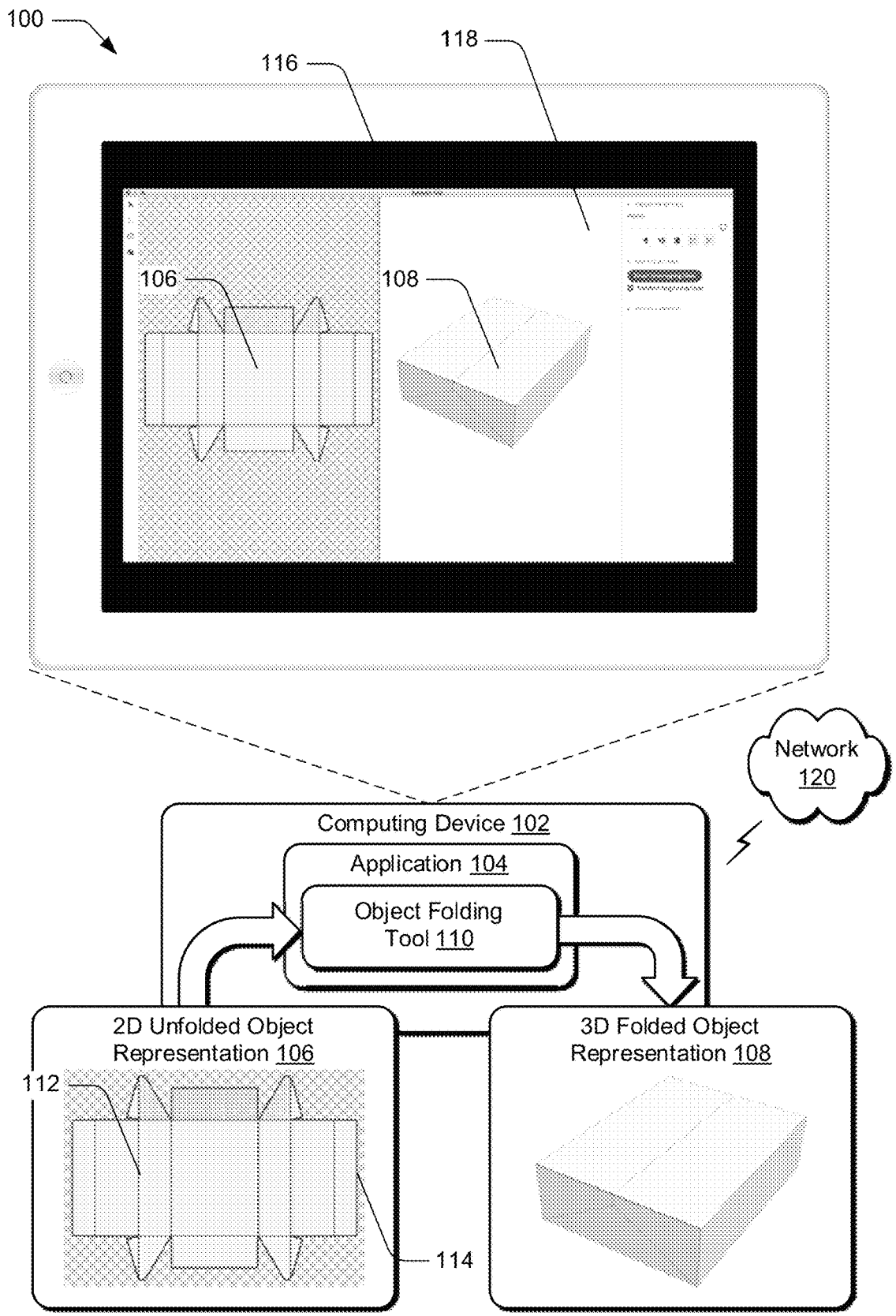
FIG. 1 is an illustration of an environment in an example implementation that is operable to employ techniques described herein.

Conventional systems enable designers to interact with a two-dimensional (2D) representation of an unfolded object (e.g., a dieline) in order to place graphics for the assembled three-dimensional (3D) folded object (e.g., a box, a bag, or an envelope). This disconnect between the 2D unfolded object representation and the 3D folded object makes it difficult to accurately place graphics onto the object, restricts the ability of the user to design an aesthetically attractive object, and often results in errors in the final folded object.

To overcome these problems, an object folding tool is leveraged in a digital medium environment. The object folding tool obtains a 2D representation of an unfolded object, and detects visual cues indicating folds for transforming the unfolded object into a 3D folded object. One example of a 2D representation of an unfolded object is a "dieline," though the 2D representation of the unfolded object may correspond to other unfolded objects, such as unfolded origami, without departing from the spirit or scope of the described techniques.

Based on a styling or type of the visual cues, the object folding tool determines fold lines indicating locations at which to fold the unfolded object in order to form the folded object. Additionally, based on the styling or type of the visual cues, the object folding tool may determine cut lines indicating locations at which to cut the unfolded object, glue lines indicating locations at which to glue or secure portions of the unfolded object to each other, perforation lines, crease lines, and so forth.

Based on the detected visual cues and the identification of the visual cues as fold lines, cut lines, and so forth, the object folding tool determines a shape of the folded object. To do so, the object folding tool determines regions of the 2D representation of the unfolded object based on enclosure by a set of the fold lines and cut lines, and then designates each of the regions as either a panel of the shape or a tab connecting panels to form the shape. As described herein, a panel corresponds to at least a portion of a surface of the folded object, whereas a tab corresponds to a portion that connects panels to each other. Based on the identified fold lines and the designation of the regions as panels or tabs, the object folding tool determines a fold angle for each of the fold lines detected from the visual cues. The object folding tool then determines the shape of the folded object by folding the unfolded object along the fold lines at the respective fold angles.

In many instances, different shapes may be generated based on different determined fold angles. As one example, consider that a box with a graphic applied to a bottom surface may be folded at a first angle such that the graphic is positioned on the bottom exterior surface of the box, or folded at a second angle such that the graphic is position on the bottom interior surface of the box. In more complex object designs, the number of different shapes that may be formed as the result of different fold angles is even higher. Thus, the object folding tool may iteratively determine different fold angles in order to generate a plurality of different candidate shapes of the folded object based on folding the unfolded object at the different fold angles, and then select one of the candidate shapes as the shape of the folded object. In some cases, the object folding tool automatically selects the shape from the plurality of candidate shapes based on one or more selection criteria, such as the enclosed volume of the candidate shapes, open edges of the candidate shapes, and so forth. Alternately, the object folding tool may display multiple candidate shapes for user selection.

The object folding tool then generates a 3D representation of the folded object having the determined shape, along with a mapping between the 2D representation of the unfolded object and the 3D representation of the folded object. To assist graphical design of the object, the object folding tool provides a user interface which concurrently displays the 2D representation of the unfolded object and the 3D representation of the folded object. The mapping between the 2D and 3D representations enables the designer to place graphics on either the 2D representation of the unfolded object or the 3D representation of the folded object, and see the visual changes reflected on each of the 2D and 3D representations in real-time. In other words, a graphic placed on a portion of the 2D representation of the unfolded object will be displayed on both the portion of the 2D representation of the unfolded object as well as the corresponding portion of the 3D representation, and vice versa.

In this way, the object folding tool provides a variety of advantages, including enabling designers to accurately place graphics onto an object and view how these graphics will appear on the final 3D folded object. Doing so reduces user interaction and frustration involved in graphic design of packaging. Moreover, providing a visualization of the 3D folded object eliminates uncertainty regarding the final design of the assembled object and reduces errors in the placement of graphics for the final folded object In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 14.

The computing device 102 is illustrated as including an application 104. The application 104 represents functionality of the computing device 102 to create and modify digital content, such as to create and modify digital photographs, create and modify raster graphics, create and modify vector graphics, apply created graphic elements (e.g., created digital photographs, raster graphics, and vector graphics) to digital representations of objects, and so forth. In the context of the described techniques, for instance, the application 104 is usable to apply created graphic elements to digital dielines and three-dimensional (3D) representations of folded objects (e.g., boxes, cartons, bags, envelopes, and so on) corresponding to such digital dielines.

In connection with this functionality, consider two-dimensional (2D) unfolded object representation 106 and 3D folded object representation 108. One example of the 2D unfolded object representation 106 is a "dieline," though the 2D unfolded object representation 106 may correspond to other unfolded objects, such as unfolded origami, without departing from the spirit or scope of the described techniques. The 3D folded object representation 108 corresponds to an object formed by folding the unfolded object represented via the 2D unfolded object representation 106.

In various scenarios, the unfolded object represented by the 2D unfolded object representation 106 may be transferred to the real world, at least in part, by printing graphics applied to the representation on a sheet of foldable material (e.g., paper, cardboard, metal, and so on) and cutting the material in a shape indicated by the representation. Other operations may also be performed as part of transferring the unfolded object to the real world, such as perforating the material, scoring the material, pressing creases into the material where it is to be folded to form the corresponding folded object, and so forth. Regardless, the real-world unfolded object may be folded (e.g., by a machine or a user) to form the corresponding real-world folded object, as represented by the 3D folded object representation 108.

As noted above, displaying visual modifications in real-time as they are made to the 2D unfolded object representation 106 concurrently on a corresponding 3D folded object representation provides a variety of advantages, including reducing user interaction involved in graphic design of packaging. To enable such concurrent display, the application 104 leverages object folding tool 110. Generally speaking, the object folding tool 110 represents functionality to generate the 3D folded object representation 108 given the 2D unfolded object representation 106 as input.

To generate the 3D folded object representation 108, the object folding tool 110 initially detects visual cues of the 2D unfolded object representation 106. In accordance with the described techniques, different visual cues are indicative of different aspects of transforming an unfolded object into a corresponding folded object, e.g., cut lines, fold lines, perforation lines, glue tabs, and so forth. By way of example, visual cues indicative of such different aspects may have different stroke and/or style attributes, such as different colors, different thicknesses, different dash-types, and so forth. In the context of the illustrated environment 100, the 2D unfolded object representation 106 includes visual cues indicative of fold lines (e.g., visual cue 112) and visual cues indicative of cut lines (e.g., visual cue 114). Here, the visual cues indicative of the fold lines are depicted as solid, red lines and the visual cues indicative of the cut lines are depicted as solid, black lines. In implementation though, the 2D unfolded object representation 106 may include different visual cues indicative of various aspects of transforming the unfolded object into the folded object without departing from the spirit or scope of the described techniques.

Figure 2:
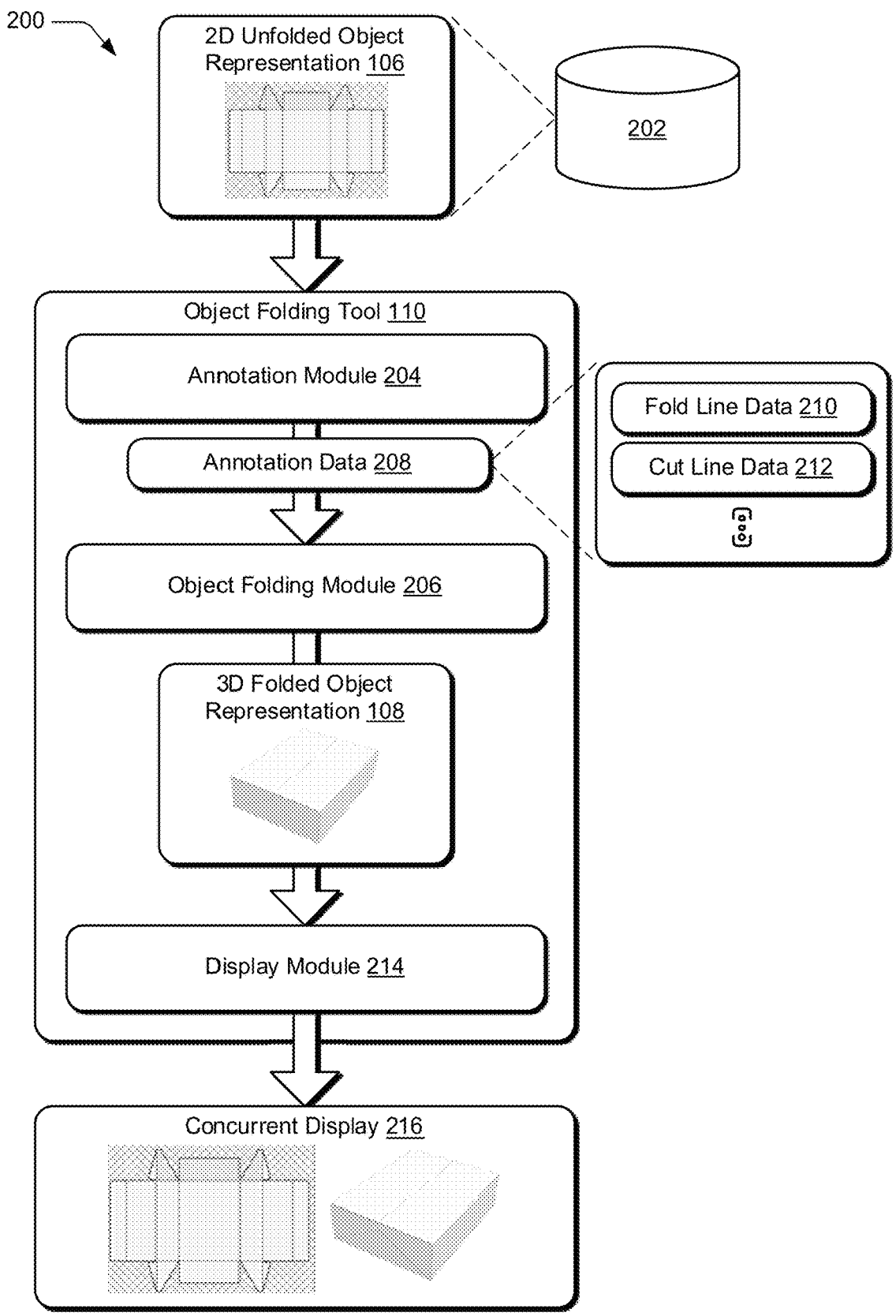
FIG. 2 depicts an example system in which the object folding tool of FIG. 1 generates a three-dimensional (3D) representation of a folded object from a two-dimensional (2D) representation of a corresponding unfolded object.

Based on the detected visual cues, the object folding tool 110 determines a shape of the folded object, as described in relation to FIG. 2. Determining a shape of the folded object based on visual cues contrasts with some conventional techniques that leverage annotations included with 2D unfolded object representations, where the annotations describe characteristics of transformational aspects, such as fold angles, whether a line corresponds to a mountain fold or a valley fold, and so forth. Conventional applications capable of leveraging these annotations, simply process them and generate 3D representations according to the included annotations—these conventional applications do not determine shapes for 3D folded object representations by detecting visual cues of 2D unfolded object representations.

The object folding tool 110 generates the 3D folded object representation 108 to have the determined shape. Once this is performed, the object folding tool 110 can cause both the 2D unfolded object representation 106 and the 3D folded object representation 108 to be displayed concurrently, such as on a display device 116 of the computing device 102.

In one or more implementations, the 2D unfolded object representation 106 and the 3D folded object representation 108 are displayed concurrently via a user interface 118 of the application 104. This user interface 118 represents functionality to receive user input to apply graphics to the 2D unfolded object representation 106 and the 3D folded object representation 108, such that when user input is received to apply a graphic to the 2D unfolded object representation 106, the object folding tool 110 also causes the user interface 118 to display the graphic being concurrently applied to corresponding portions of the 3D folded object representation 108. Similarly, when user input is received to apply a graphic to the 3D folded object representation 108, the object folding tool 110 causes the user interface 118 to display the graphic being concurrently applied to corresponding portions of the 2D unfolded object representation 106.

In addition or alternately, the object folding tool 110 is capable of generating a file based on the determined shape of the folded object. This file may be usable to transfer the object to the real world, such as by including instructions which instruct a machine (e.g., printer, cutting machine, folding machine, etc.) how to form the unfolded object and/or folded object from raw material (e.g., paper or cardboard). The file may also include or be usable to generate human-understandable instructions for performing portions of transferring the object to the real world, such as instructions for folding an already printed and cut object in an unfolded state to form the folded object. In one or more implementations, for instance, the file may be usable by the computing device 102 or by another computing device accessible via network 120 to generate textual instructions, picture-based instructions where each picture depicts one or more folds in a sequence to form the folded object, video-based instructions showing the sequence of folds to form the folded object, and so forth.

Although illustrated as implemented locally at the computing device 102, functionality of the illustrated object folding tool 110 may also be implemented in whole or part via functionality available via the network 120, such as part of a web service or "in the cloud." It is also to be appreciated that the 2D unfolded object representation 106 and the 3D folded object representation 108 may be maintained remotely and/or communicated over the network 120, though depicted at the computing device 102 in the illustrated example.

Having considered an example environment, consider now a discussion of some example details of the techniques for an object folding tool in a digital medium environment in accordance with one or more implementations.

Object Folding Tool

FIG. 2 depicts an example system 200 in which an object folding tool of FIG. 1 generates a three-dimensional (3D) representation of a folded object from a two-dimensional (2D) representation of a corresponding unfolded object. The illustrated example 200 includes from FIG. 1 the object folding tool 110.

The object folding tool 110 is depicted receiving the 2D unfolded object representation 106, which as illustrated as being maintained in storage 202. The storage 202 may correspond storage that is local to the example system 200 or that is remote from the example system 200 and accessible via a communicable coupling, e.g., over the network 120. The 2D unfolded object representation 106 may be obtained in a variety of formats. For instance, the 2D unfolded object representation 106 may be obtained as a file formatted in portable document format (PDF), as a file including a vector graphic of the 2D unfolded object representation 106, and so on. The 2D unfolded object representation 106 may be formatted in different ways without departing from the spirit or scope of the described techniques.

In accordance with the described techniques, the object folding tool 110 processes the obtained 2D unfolded object representation 106 and generates the 3D folded object representation 108. The illustrated example 200 includes annotation module 204 and object folding module 206, which represent functionality of the object folding tool 110 to carry out this processing and generation. Broadly speaking, the annotation module 204 represents functionality to detect visual cues of the 2D unfolded object representation 106 and generate annotation data 208. As noted above, visual cues of the 2D unfolded object representation 106 may indicate locations of different transformational aspects through different strokes and styles. For instance, lines formatted in a first combination of stroke and style may indicate locations where a material is to be cut to produce the object in an unfolded state and lines formatted in a second combination of stroke and style may indicate locations where the object is to be folded to form the folded object. The annotation module 204 is configured to detect the differences in these visual cues and attribute aspects of transformation to locations indicated by the visual cues.

The annotation data 208 generated by the annotation module 204 describes these aspects indicated by the detected visual cues. In the illustrated example 200, the annotation data 208 includes fold line data 210 and cut line data 212. The illustrated fold line data 210 describes visual cues of the 2D unfolded object representation 106 that are indicative of fold lines—which may have a first stroke and style combination. It follows then that the cut line data 212 describes visual cues of the 2D unfolded object representation 106 that are indicative of cut lines—which may have a second stoke and style combination different from the first combination. The ellipses indicate that the annotation data 208 may include data describing other aspects of transformation, such as perforation data and glue data, without departing from the spirit or scope of the described techniques. It should also be appreciated that in some scenarios, the generated annotation data 208 may not include the cut line data 212, such as in connection with origami. In these scenarios, the generated annotation data 208 may simply identify an "edge" corresponding to a boundary of a piece of origami paper.

In one or more implementations, the annotation module 204 analyzes the 2D unfolded object representation 106 and generates the annotation data 208 as a graph representation comprising edges (e.g., the cut and fold lines), vertices (e.g., intersections of edges), regions (e.g., based on the enclosure by a set of edges), and holes). The annotation module 204 analyzes a topology of this graph as well as stroke and styling of the visual cues to apply assignments to detected edges. For instance, the annotation module 204 designates the detected lines as folds or cuts and further designates the folds as mountains or valleys.

The object folding module 206 represents functionality of the object folding tool 110 to determine a shape of the 3D folded object representation 108 based on the generated annotation data 208. In other words, the object folding module 206 determines this shape based on the aspects indicated by the visual cues. For instance, the object folding module 206 initially identifies regions of the 2D unfolded object representation 106 that correspond to panels and tabs of the folded object. In so doing, the object folding module 206 may define separate regions of the 2D unfolded object representation 106 based on enclosure within a set of fold lines and cut lines, e.g., each region is surrounded by a combination of fold and/or cut lines. The object folding module 206 may then designate each of these determined regions as panels, which form exposed surfaces of the shape, or as tabs, which may be tucked or otherwise disposed so as to connect the surfaces.

After identifying, fold lines, cut lines, panels, and tabs, the object folding module 206 computes a plurality of different candidate shapes where the unfolded object is folded along the fold lines and the tabs affix panels, e.g., the tabs are folded and glued to the panels. The object folding module 206 is configured to perform a correspondence analysis to determine a feasibility or infeasibility of the various candidate shapes. For each of the candidate shapes determined feasible, the object folding module 206 determines a fold angle for each fold line. These determined fold angles enable the unfolded object to be folded into the determined shape, forming the folded object.

In one or more implementations, the object folding module 206 further globally analyzes the 2D unfolded object representation 106 to identify geometric correspondences. These geometric correspondences include angle bisectors, which may form tabs in the folded form, and also include edges of similar length. In addition to this global analysis for correspondences, the object folding module 206 locally analyzes each of the detected vertices—where at least two detected cut or fold lines converge—of the 2D unfolded object representation 106. Based on this local analysis, the object folding module 206 determines whether the vertices correspond to a static folding or, in the case of vertices having at least some degree of freedom, bounds of motion for those vertices. These determinations correspond to "vertex constraints" of the respective vertices.

Given these vertex constraints, the object folding module 206 leverages an iterative process to determine a set of fold angles, where the set includes a determined fold angle for each of the determined edges—no folding or zero degrees in the case of cut lines and some different angle in the case of fold lines. This determined set of fold angles is limited insofar as each fold angle must satisfy the vertex constraints. In this iterative process, the object folding module 206 initially assigns fold angles to edges proximate vertices having zero degrees of freedom, as indicated by the vertex constraints. For the edges where there is only one configuration in which the unfolded object may be folded to produce a shape, the object folding module 206 updates the graph representation by merging any vertices and edges that are coincident—in the 3D shape of the folded object—as a result of causing the shape to include the one configuration. After merging these coincident vertices of a given iteration, the object folding module 206 analyzes the updated graph representation by again iterating through all of the vertices, e.g., to assign fold angles, detect edges with only one possible configuration, and update the graph representation.

In scenarios where performing this iterative process determines multiple valid final shapes of the folded object, the object folding module 206 stores each of the valid final shapes, e.g., in the storage 202. In one or more implementations, the object folding module 206 causes display of 3D representations of at least two of these valid final shapes—and in some cases all of them—via a user interface which allows a user to select the shape from the displayed representations. Alternately or in addition, the object folding module 206 ranks the valid final shapes according to some metric, such as maximization of an enclosed volume of the shape, minimization of open edges in 3D, a combination of these, and so forth. Based on this ranking, the object folding module 206 may display the representations for selection with some indication of their ranking, e.g., presented in ranked order or with a graphical element indicative of the ranking. The object folding module 206 may also simply select a highest-ranking shape from the multiple valid final shapes without presenting the multiple shapes for selection.

The object folding module 206 can then generate the 3D folded object representation 108 to have the selected shape. It should be appreciated that in some scenarios, the iterative process performed by the object folding module 206 may not determine multiple final valid shapes. Instead, the object folding module 206 may determine a single final valid shape by performing the iterative process. In such cases, the object folding module 206 generates the 3D folded object representation 108 to have this determined shape.

In the illustrated example 200, the 3D folded object representation 108 is depicted as input to display module 214. The display module 214 represents functionality to display the 2D unfolded object representation 106 and the 3D folded object representation 108, e.g., via a user interface of the application 104. In one or more implementations, the display module 214 generates concurrent display 216, which displays both the 2D unfolded object representation 106 and the 3D folded object representation 108 concurrently. Not only does the concurrent display 216 represent that the 2D unfolded object representation 106 and the 3D folded object representation 108 are displayed concurrently, but the concurrent display 216 also represents that visual modifications made to one of the representations via user input are concurrently made in real-time to the other representation. By way of example, if user input is received to add a vector graphic to the 2D unfolded object representation 106 displayed via the concurrent display 216, then, in real-time as the vector graphic is displayed being added to the 2D unfolded object representation 106, the vector graphic is also displayed being added to a corresponding portion of the 3D folded object representation 108. In a similar manner, the described system concurrently applies visual modifications to the 2D unfolded object representation 106 when user input is received to apply modifications in relation to the 3D folded object representation 108.

To enable this concurrent display of visual modifications, the display module 214 leverages a mapping between the panels of the 2D unfolded object representation 106 and the 3D folded object representation 108. Given the shape determined as discussed above, the object folding module 206 is capable of generating a bidirectional mapping between the 2D unfolded object representation 106 and the 3D folded object representation 108. This mapping (not shown) may be stored in the storage 202. In the context of displaying the concurrent display 216 via a user interface, consider the following discussion of FIGS. 3-10.

Figure 3:
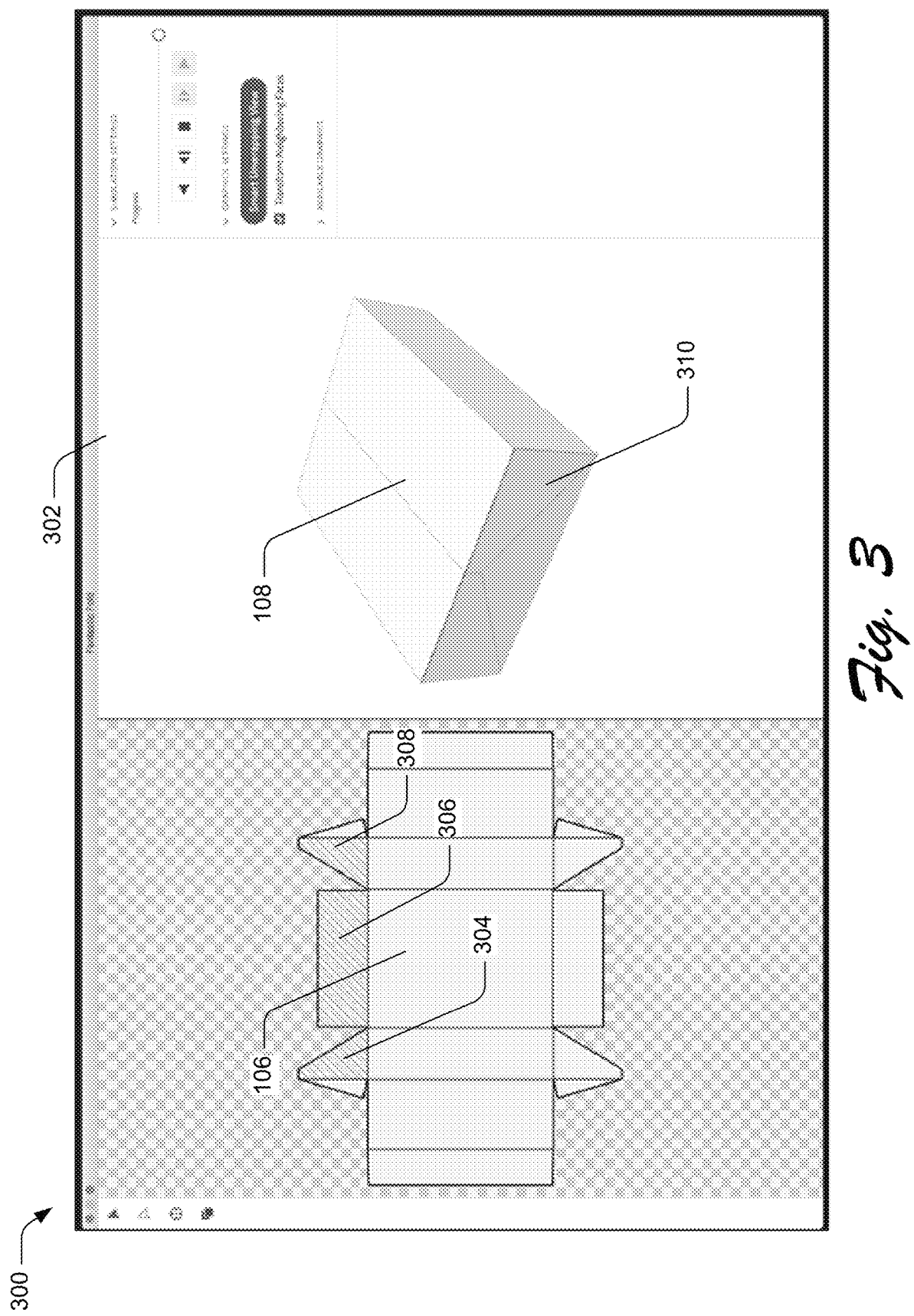
FIG. 3 depicts an example user interface via which a 2D representation of an unfolded object and a 3D representation of a folded object are concurrently displayed.

FIG. 3 depicts an example 300 of a user interface via which a 2D representation of an unfolded object and a 3D representation of a folded object are concurrently displayed.

The illustrated example 300 includes an object-interaction interface 302, which may be displayed via a display device communicably coupled to the computing device 102. In this example 300, the object-interaction interface 302 is depicted concurrently displaying the 2D unfolded object representation 106 and the 3D folded object representation 108. In other words, the object-interaction interface 302 presents the concurrent display 216. As described in more detail below, the object-interaction interface 302 includes instrumentalities relative to which user input can be received to visually modify the 2D unfolded object representation 106 and the 3D folded object representation 108.

In one or more implementations, the object-interaction interface 302 also includes instrumentalities relative to which user input can be received to perform other operations, such as to change a view of the displayed representations (e.g., rotate the 3D folded object representation 108 to view different surfaces or view the surfaces at different angles, select different cameras at different positions in a 3D space that includes the 3D folded object representation 108, and so on), to view 3D representations of the object in partially folded states, to view a progression of folding operations between the object in the unfolded state and the folded state (e.g., where the progression can be shown in a direction from an unfolded state to a folded state—folding the object, in a direction from the folded state to an unfolded state—unfolding the object, and where portions less than an entirety of the progression can be shown), and so forth. These progressions may be viewed via snapshots (e.g., images) at different intervals of the progression (e.g., at each fold) or as videos showing the object being folded or unfolded.

The instrumentalities may also allow a user to select to move one step at a time through a folding or unfolding progression. Consider an example in which the folded object is a box. In this scenario, the object-interaction interface 302 may include an instrumentality via which a user can select to unfold the 3D representation of the box by one unfolding step, such as rotating back panels corresponding to a box top. This rotating back may expose an inside of the box and/or other panels of the box. In this way, a user is able to view a design applied to the inside of the box and/or exposed panels when the top panels are rotated back. In other words, these progressions may be displayed, simulating a folding or unwrapping experience. In this way, the object-interaction interface 302 enables design of objects, such as packages, to improve an unwrapping experience.

In the illustrated example 300, the object-interaction interface 302 also visually emphasizes panels 304, 306, 308 of the 2D unfolded object representation 106 and a corresponding surface 310 of the 3D folded object representation 108 that are in "focus," which means that visual modification operations may be performed in relation to these in-focus panels and surfaces. In the illustrated example 300, the object-interaction interface 302 indicates the in-focus panels 304, 306, 308 and corresponding surface 130 graphically by overlaying a blue hash. Certainly, the object-interaction interface 302 may indicate in-focus panels and surfaces in other ways without departing from the spirit or scope of the described techniques. In one or more implementations, the object-interaction interface 302 may not display a visual emphasis on panels and surfaces that are in "focus." In any case, the object-interaction interface 302 may indicate in-focus panels and corresponding surfaces by leveraging the bidirectional mapping between the 2D unfolded object representation 106 and the 3D folded object representation 108.

Figure 4:
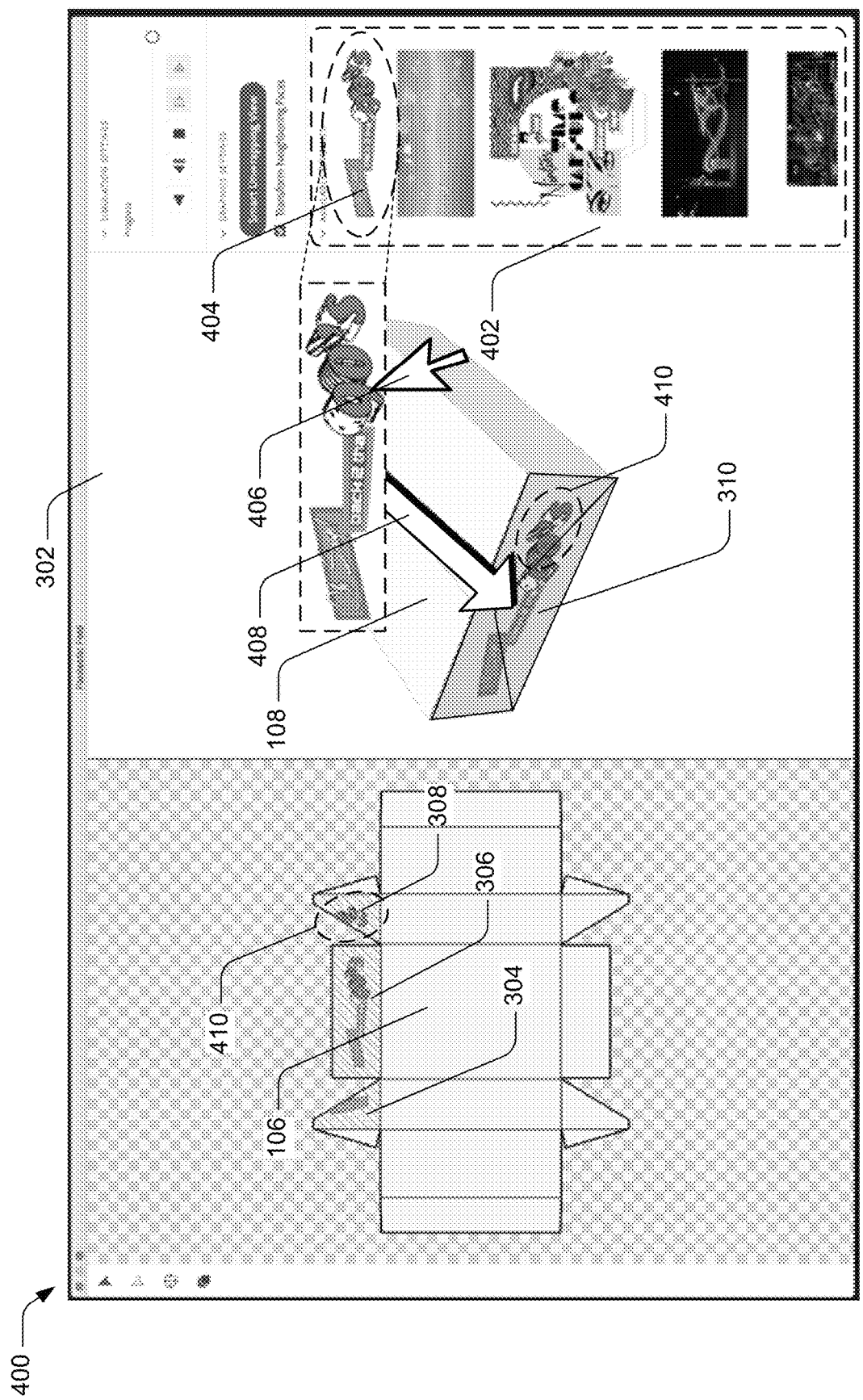
FIG. 4 depicts another example user interface via which user input to visually modify one of a 2D or 3D representation causes concurrent visual modification of both representations.

FIG. 4 depicts another example 400 of a user interface via which user input to visually modify one of a 2D or 3D representation causes concurrent visual modification of both representations.

The illustrated example 400 also includes the object-interaction interface 302. In this example 400, the object-interaction interface 302 is depicted including various graphics 402, which are user selectable for application to the 2D unfolded object representation 106 and the 3D folded object representation 108. In this particular example 400, application of a graphic to the representations is discussed in relation to particular graphic 404. The object-interaction interface 302 is capable of receiving user input to select the particular graphic 404 from the various graphics 402—certainly any of the various graphics 402 may be user selected for application. The object-interaction interface 302 is also capable of receiving user input in relation to one of the 2D unfolded object representation 106 or the 3D folded object representation 108, where this user input specifies a location of the one representation at which to apply the graphic. The illustrated example includes cursor 406, which is depicted dragging (represented by arrow 408) the particular graphic 404 onto the surface 310 of the 3D folded object representation 108. In many scenarios, no cursor may be displayed, such as in connection with touch-based interaction. In at least some scenarios, different types of 'cursors' may be displayed, e.g., points indicative of a tip of a stylus or touch input. In any case, the represented dragging input represents input specifying a location of one of the representations, in this case the 3D folded object representation 108. Notably, the object-interaction interface 302 is depicted visually modifying the 2D unfolded object representation 106 and the 3D folded object representation 108 concurrently, such that the graphic is applied to a corresponding location of the 2D unfolded object representation 106 in real-time as it is applied to the specified location of the 3D folded object representation 108. In this case, the corresponding location of the 2D unfolded object representation 106 is the panels 304, 306, 308.

The illustrated example 400 also represents a scenario in which a visual modification of a surface of the 3D folded object representation 108 corresponds to multiple panels of the 2D unfolded object representation 106. Moreover, these panels are not contiguous, such that in the unfolded state— represented by the 2D unfolded object representation 106— mere portions of the visual modification are present on the different panels. Consider graphic portion 410, for instance. In the folded state, the graphic portion 410 appears substantially contiguous with a rest of the particular graphic 404 as applied to the surface 310. On the 2D unfolded object representation 106, however, the graphic portion 410 on the panel 308 is not contiguous with other portions of the particular graphic 404, e.g., the portions of the particular graphic 404 on the panels 304, 306. By allowing users to provide input in relation to only one of the 2D unfolded object representation 106 or the 3D folded object representation 108, but automatically applying visual changes to both representations, the described system reduces user input involved in object (e.g., package) design. This is at least because the system does not require the user to provide input in relation to both representations to apply visual modifications.

Figure 5:
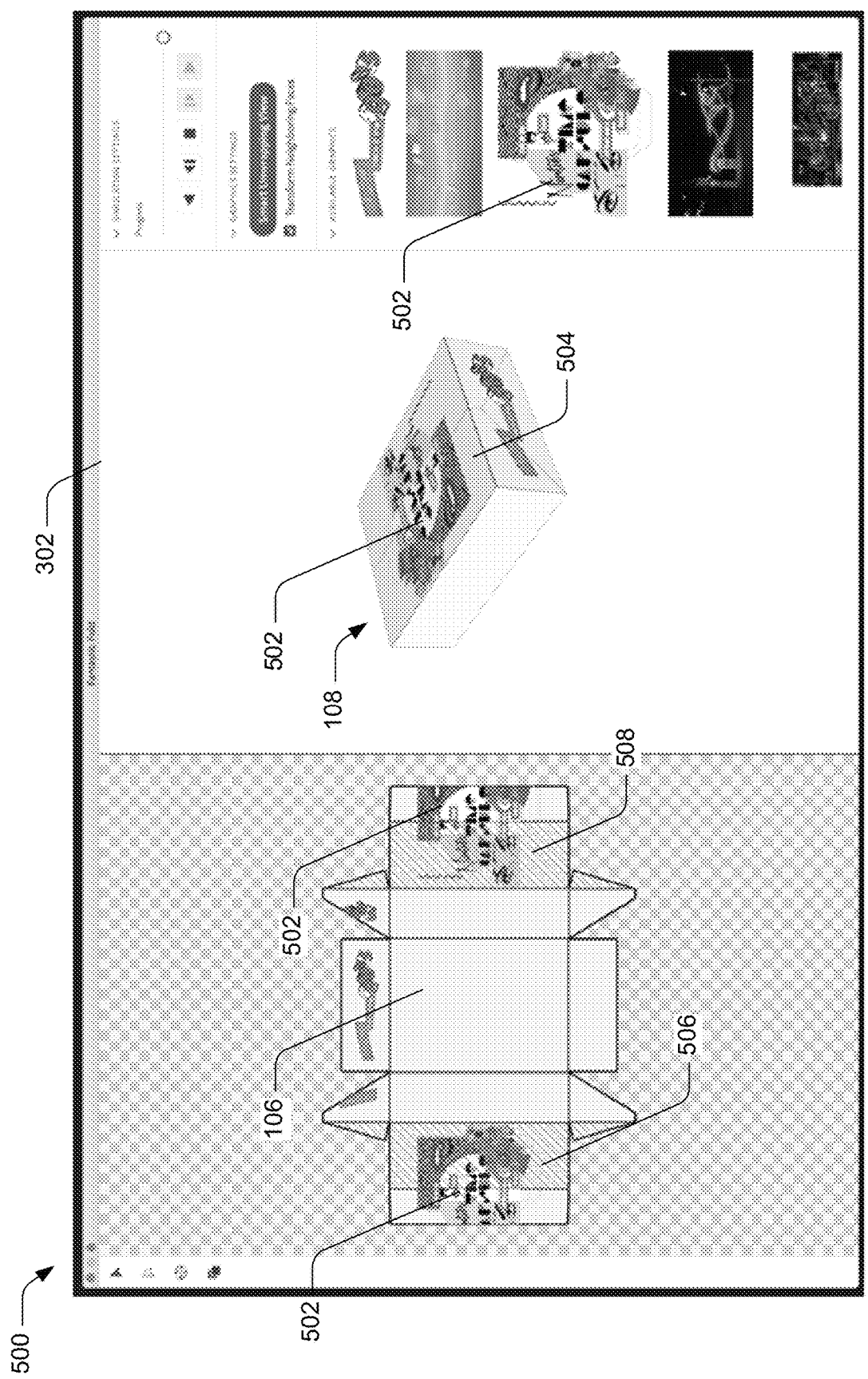
FIG. 5 depicts another example user interface via which visual modifications applied to a surface of a 3D folded object representation span multiple non-contiguous panels of a 2D unfolded object representation.

FIG. 5 depicts another example 500 of a user interface via which visual modifications applied to a surface of a 3D folded object representation span multiple non-contiguous panels of a 2D unfolded object representation.

The illustrated example 500 also includes the object-interaction interface 302. In this example 500, the object-interaction interface 302 is depicted displaying the 3D folded object representation 108 with graphic 502 on a top surface 504. The graphic 502 may have been previously applied based on user input received via the object-interaction interface 302. In any case, the object-interaction interface 302 is depicted displaying the graphic 502 on the 2D unfolded object representation 106. On the 2D unfolded object representation 106, the graphic 502 spans multiple non-contiguous panels 506, 508, which correspond to the top surface 504.

Figure 6:
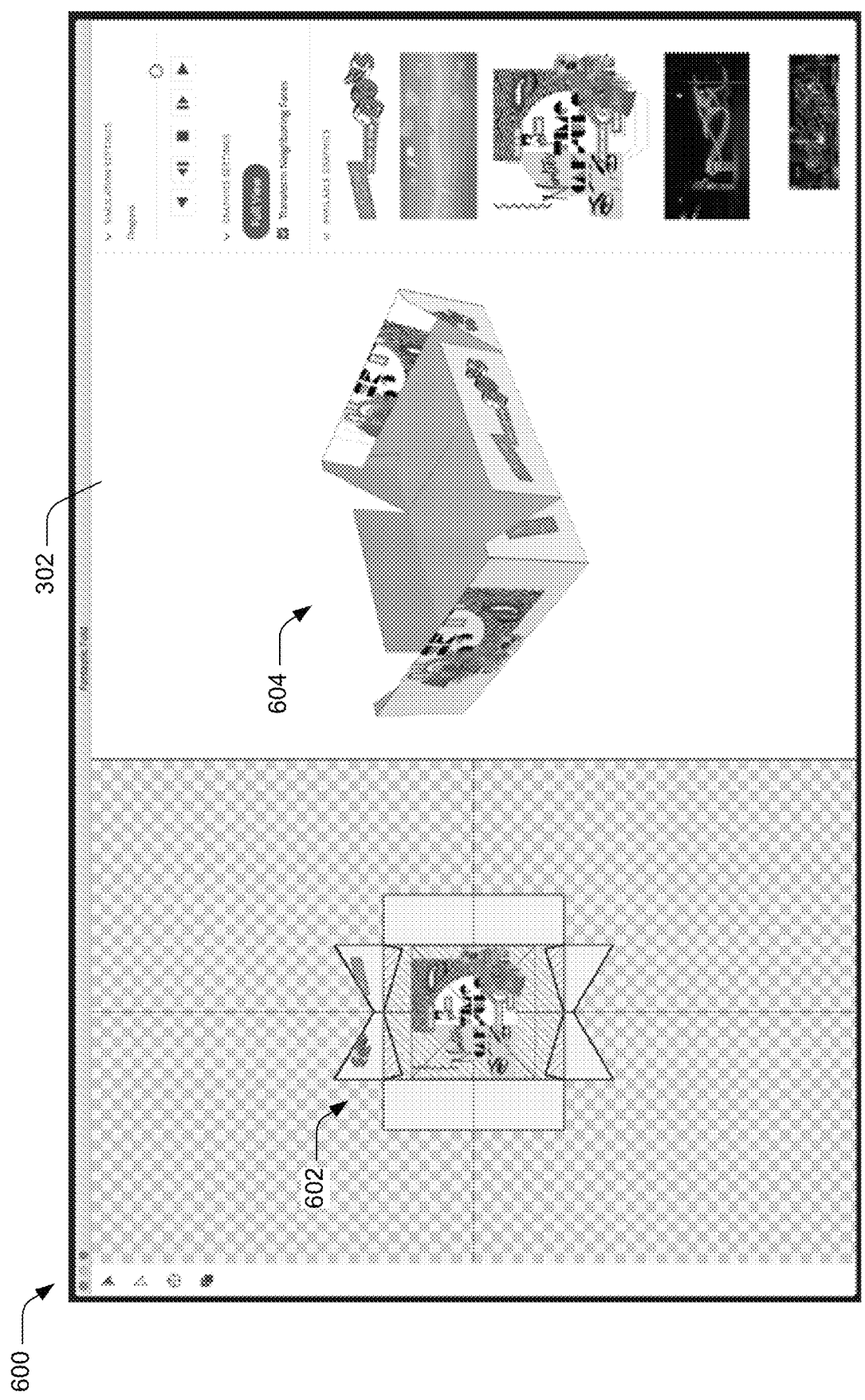
FIG. 6 depicts another example user interface via which a 3D representation of a partially folded object is displayed and in which panels corresponding to a surface of the folded object and panels adjacent to the surface's panels are displayed.

FIG. 6 depicts another example 600 of a user interface via which a 3D representation of a partially folded object is displayed and in which panels corresponding to a surface of the folded object and panels adjacent to the surface's panels are displayed.

The illustrated example 600 also includes the object-interaction interface 302. In this example 600, the object-interaction interface 302 is depicted displaying a 2D assistive view 602 and a 3D partially folded object representation 604. The assistive view 602 includes the in-focus panels of the object and the panels adjacent to the in-focus panels. In other words, the assistive view 602 is a locally flattened view of the object's 3D geometry, on which graphics editing operations can be performed.

In this example 600, the in-focus panels correspond to the top surface 504 of the object in a folded state. The assistive view 602 depicts an arrangement of the in-focus panels, as folded. The displayed neighboring panels may assist graphical design of the unfolded object. In contrast to the 2D unfolded object representation 106 depicted in the previous figures, the assistive view 602 does not correspond to what the object looks like flattened or what a material will look like when cut and printed to form the folded object.

To generate this assistive view 602, the object folding tool 110 transforms the 2D unfolded object representation 106 by rearranging its panels and tabs into an arrangement that approximates a view of the 3D folded object representation 108, e.g., a view of a top of the 3D folded object representation 108. This arrangement closely matches a 3D geometry and locality of surfaces of the folded object. The object folding tool 110 also includes the adjacent panels in this arrangement, as illustrated. In this example, the adjacent panels correspond to sides of the 3D folded object representation 108. After graphics are applied to the panels via the assistive view 602, the object folding tool 110 determines a transformation of the graphics—based on the bidirectional mapping—to position the graphics on the 2D unfolded object representation 106. In this way, the graphics can be laid out on the 2D unfolded object representation 106 for production, e.g., printing of the graphics on a sheet of material.

The 3D partially folded object representation 604 represents a state between a completely unfolded state of the object (e.g., the 2D unfolded object representation 106) and a completely folded state of the object (e.g., the 3D folded object representation 108).

Figure 7:
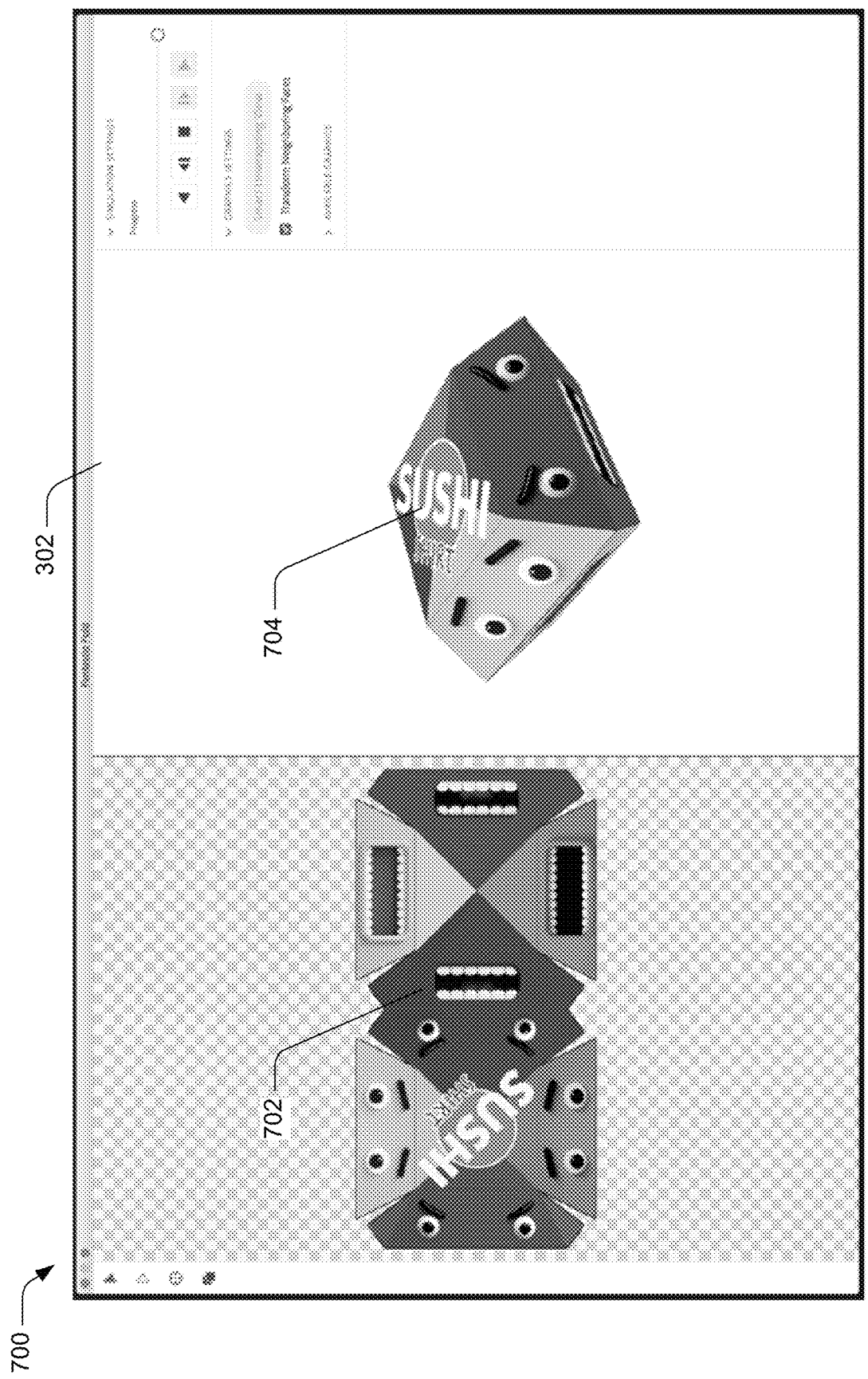
FIG. 7 depicts another example user interface via which a 2D representation of an object in an unfolded state and a 3D representation of the object in a first folded state are concurrently displayed.

FIG. 7 depicts another example 700 of a user interface via which a 2D representation of an object in an unfolded state and a 3D representation of the object in a first folded state are concurrently displayed.

The illustrated example 700 also includes the object-interaction interface 302. In this example 700, the object-interaction interface 302 is depicted displaying a 2D unfolded representation 702 and a 3D folded representation 704 of packaging. In this case, the packaging corresponds to a box for holding food (e.g., sushi) and the 3D folded representation 704 represents a first folded state of the object (e.g., closed).

Figure 8:
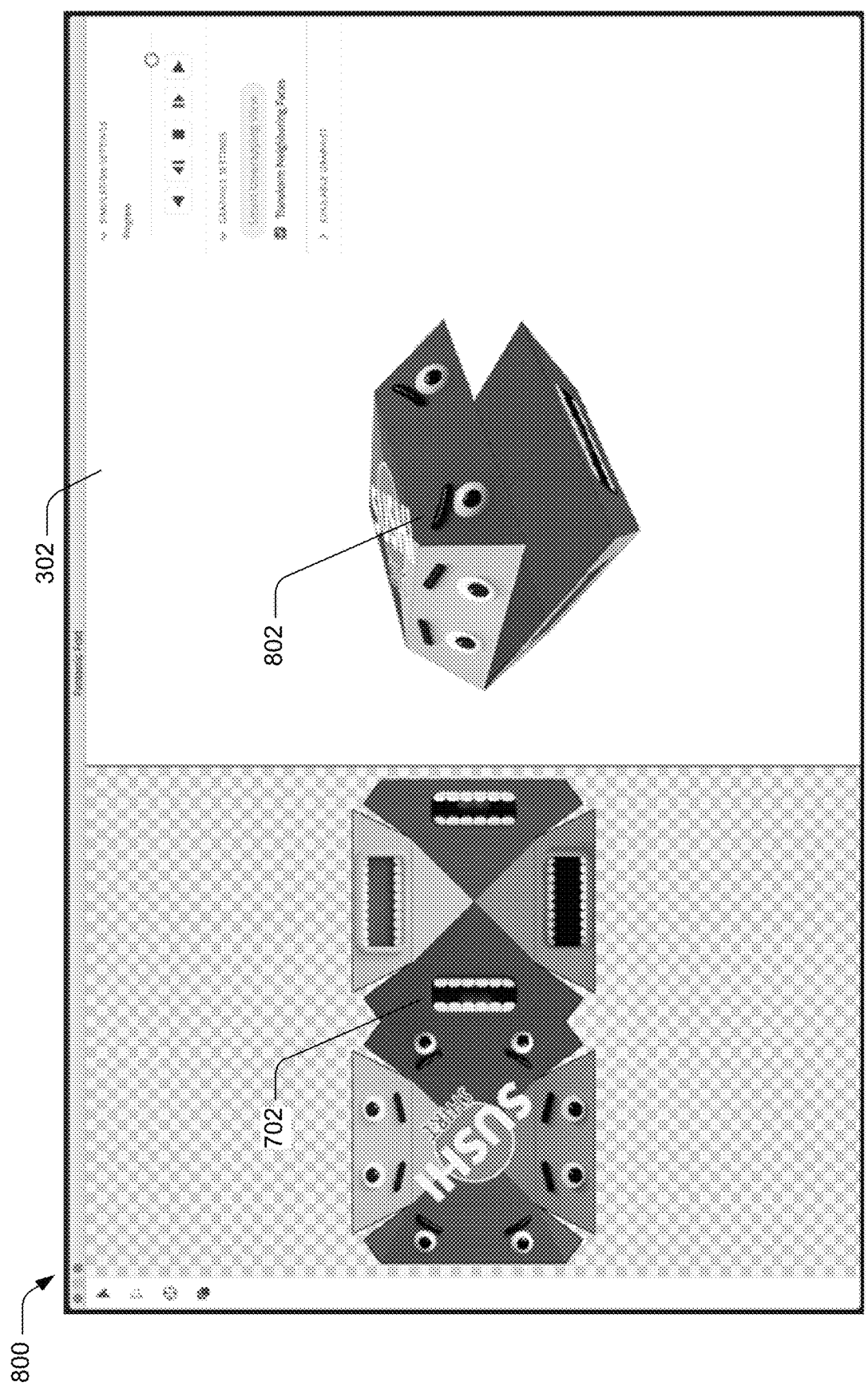
FIG. 8 depicts another example user interface via which the 2D representation of the object in the unfolded state and a 3D representation of the object in a second folded state are concurrently displayed.

FIG. 8 depicts another example 800 of a user interface via which the 2D representation of the object in the unfolded state and a 3D representation of the object in a second folded state are concurrently displayed.

The illustrated example 800 also includes the object-interaction interface 302. In this example 800, the object-interaction interface 302 is depicted displaying the 2D unfolded representation 702 and 3D folded representation 802 of the packaging depicted in FIG. 7. In this example 800, the 3D folded representation 802 represents a second folded state of the object, e.g., partially opened.

Figure 9:
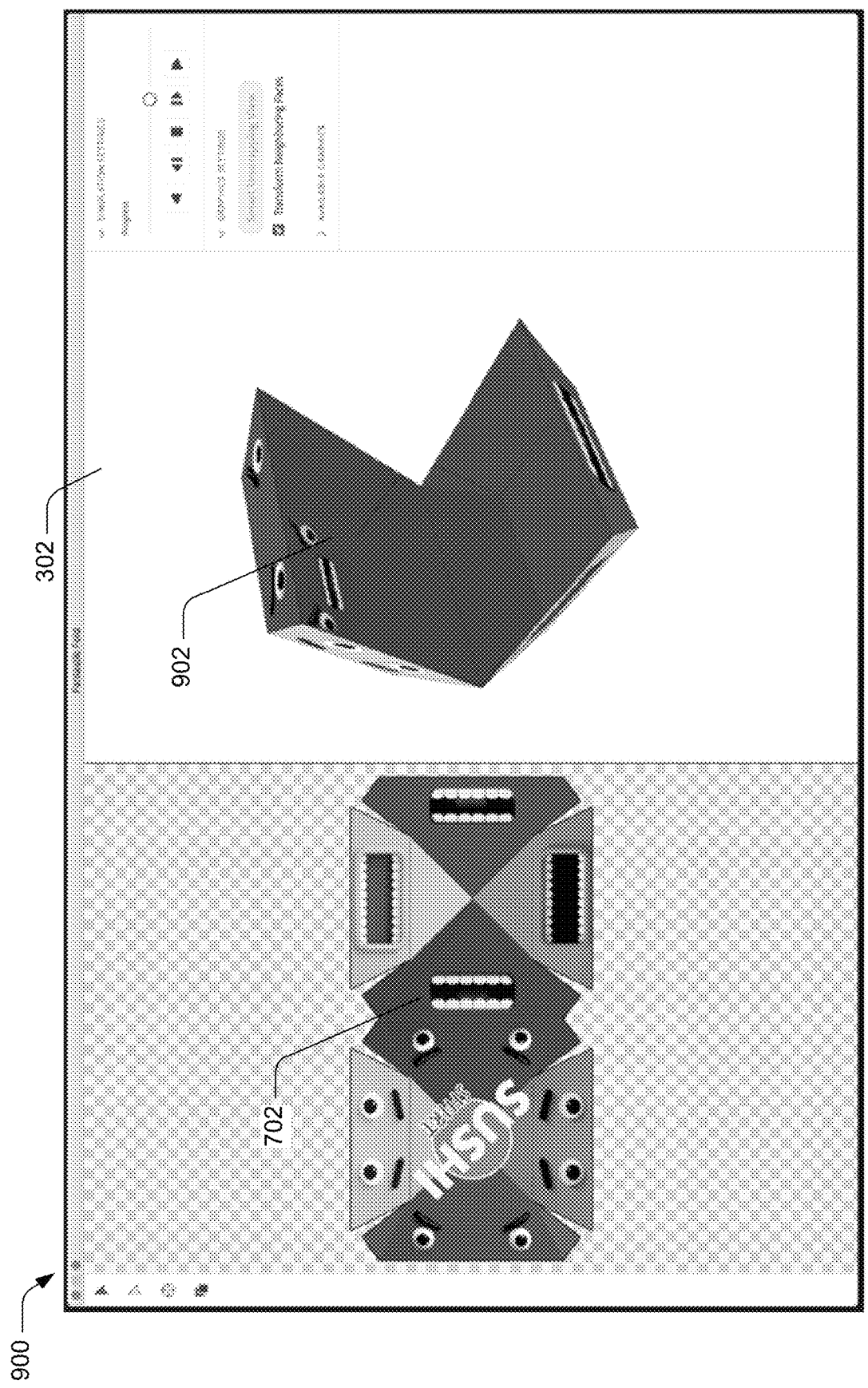
FIG. 9 depicts another example user interface via which the 2D representation of the object in the unfolded state and a 3D representation of the object in a third folded state are concurrently displayed.

FIG. 9 depicts another example 900 of a user interface via which the 2D representation of the object in the unfolded state and a 3D representation of the object in a third folded state are concurrently displayed.

The illustrated example 800 also includes the object-interaction interface 302. In this example 900, the object-interaction interface 302 is depicted displaying the 2D unfolded representation 702 and a 3D folded representation 902 of the packaging depicted in FIGS. 7 and 8. In this example 900, the 3D folded representation 902 represents a third folded state of the object, e.g., the package is partially opened more than in FIG. 8. Displaying these different states of the folded object can be used in other scenarios, such as showing a shopping bag in an open configuration (e.g., in which products can be placed), and showing the shopping bag in a closed configuration (e.g., when flattened for storage). Moreover, these different displays may be exported to create additional digital content, such as a shopping bag with a design having shopping goods disposed in the shopping bag. The system's ability to generate representations of objects in various configurations of fold and unfold may be used in a variety of different scenarios without departing from the spirit or scope of the described techniques.

Figure 10:
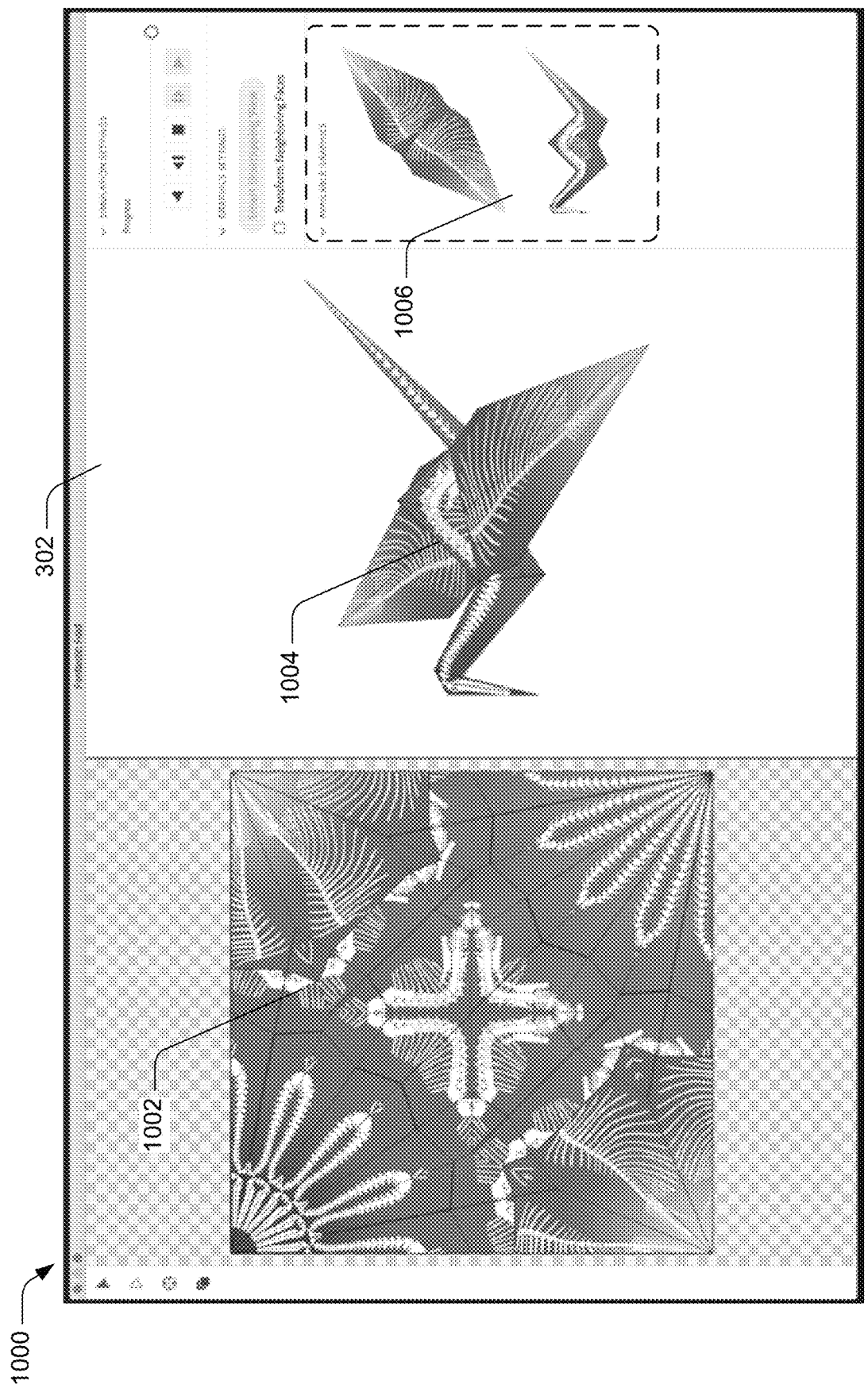
FIG. 10 depicts another example user interface via which a 2D representation of origami in an unfolded state and a 3D representation of the origami in a folded state are concurrently displayed.

FIG. 10 depicts another example 1000 of a user interface via which a 2D representation of origami in an unfolded state and a 3D representation of the origami in a folded state are concurrently displayed.

The illustrated example 1000 also includes the object-interaction interface 302. In this example 1000, the object-interaction interface 302 is depicted displaying a 2D unfolded representation 1002 and a 3D folded representation 1004 of an origami object. In this case, the origami object corresponds to a crane and the 3D folded representation 1004 represents a fully folded state of the object whereas the 2D unfolded representation 1002 simply represents unfolded origami paper with the depicted designs. The object-interaction interface 302 also includes various graphics 1006, which are applied to portions of the 3D folded representation 1004 and corresponding portions of the 2D unfolded representation 1002. This discrepancy in what the graphics look like between the 3D folded representation 1004 and corresponding portions of the 2D unfolded representation 1002 clearly illustrates how mapping visual modification between 2D unfolded objects and corresponding 3D folded objects can be nearly, if not completely, impossible for humans in different scenarios.

Having discussed example details of the techniques for an object folding tool, consider now some example procedures to illustrate additional aspects of the techniques.

Example Procedures

This section describes example procedures for an object folding tool in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the object folding tool 110 of FIG. 1.

FIG. 11 depicts an example procedure 1100 in which a three-dimensional (3D) representation of a folded object having a determined shape is generated from a two-dimensional (2D) representation of a corresponding unfolded object.

Visual cues of a 2D representation of an unfolded object are detected by at least one computing device (block 1102). In accordance with the principles discussed herein, the visual cues indicate folds for transforming the unfolded object into a folded object. By way of example, the annotation module 204 detects the visual cues 112, 114 of the 2D unfolded object representation 106.

A shape of the folded object is determined by the at least one computing device based on the detected visual cues (block 1104). By way of example, the object folding module 206 determines a shape of the folded object based on the visual cues detected at block 1102.

A 3D representation of the folded object having the determined shape is generated by the at least one computing device (block 1106). By way of example, the object folding module 206 generates the 3D folded object representation 108 to have the shape determined at block 1104.

Figure 12:
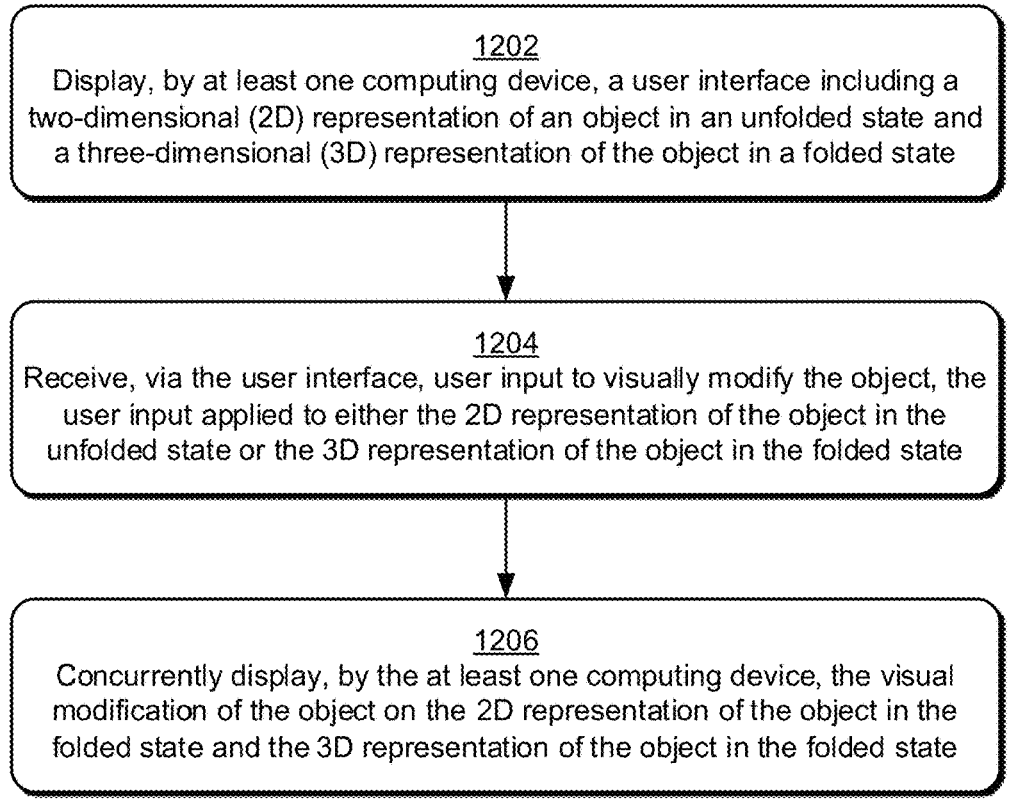
FIG. 12 depicts a procedure in an example implementation in which visual modification is displayed concurrently of a 2D representation of an object in an unfolded state and a 3D representation of the object in a folded state.

FIG. 12 depicts an example procedure 1200 in which visual modification is displayed concurrently of a 2D representation of an object in an unfolded state and a 3D representation of the object in a folded state.

A user interface including a 2D representation of an object in an unfolded state and a 3D representation of the object in a folded state is displayed by at least one computing device (block 1202). By way of example, the computing device displays the object-interaction interface 302, which includes the concurrent display 216 having the 2D unfolded object representation 106 and the 3D folded object representation 108.

User input is received, via the user interface, to visually modify the object (block 1204). In accordance with the principles discussed herein, the user input is applied to either the 2D representation of the object in the unfolded state or the 3D representation of the object in the folded state. In the context of FIG. 4, for instance, the dragging input indicated by the arrow 408 is received via the object-interaction interface 302 to apply the particular graphic 404 to the 3D folded object representation 108.

The visual modification of the object for the 2D representation of the object in the unfolded state and the 3D representation of the object in the folded state are concurrently displayed (block 1206). By way of example, the display module 214 causes application of the particular graphic 404 to both the 2D unfolded object representation 106 and the 3D folded object representation 108 to be displayed concurrently, even though the user input to apply the particular graphic 404 is received in relation to the 3D folded object representation 108.

Figure 13:
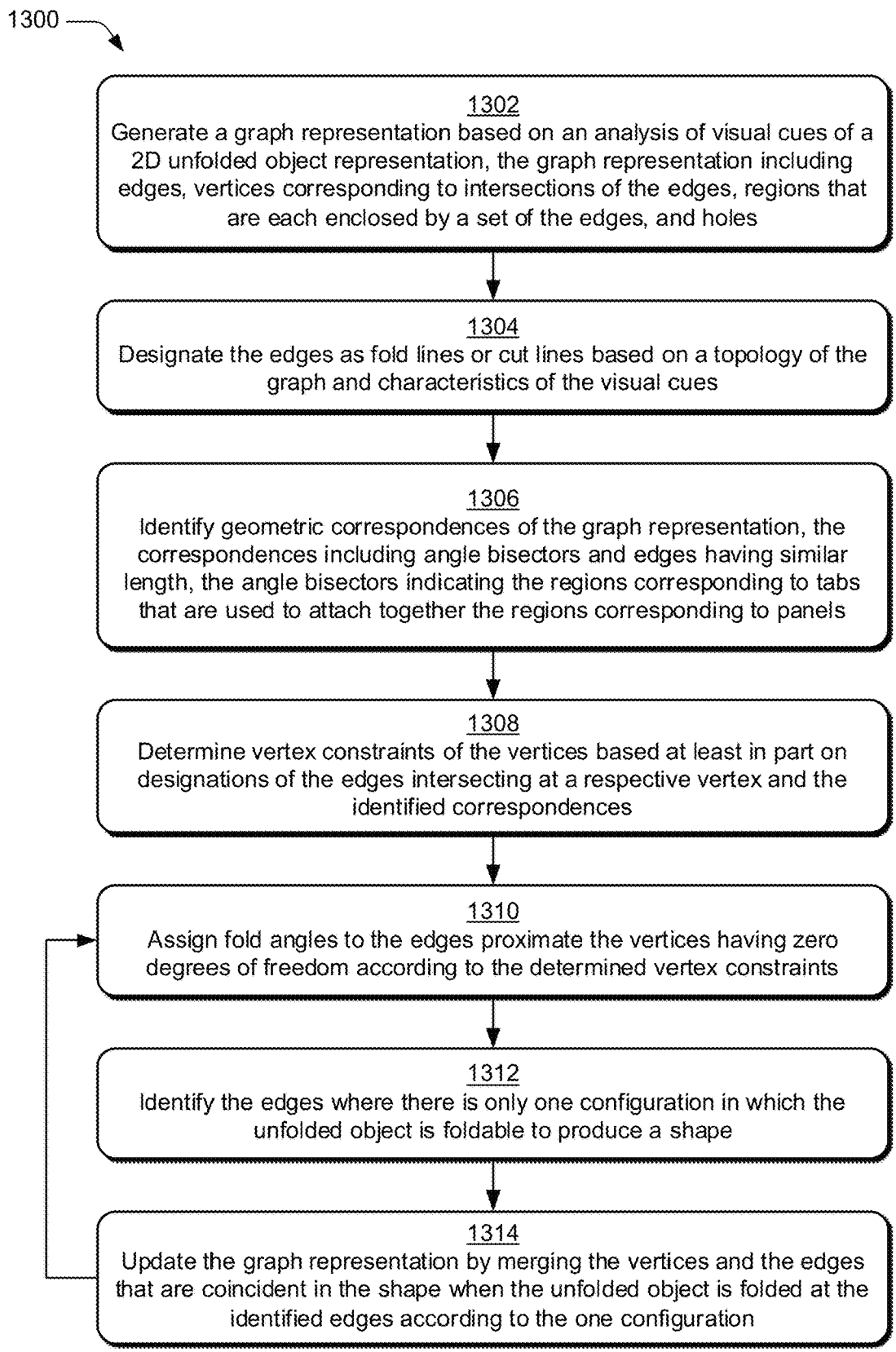
FIG. 13 depicts a procedure in an example implementation in which a shape of a 3D representation of a folded object is determined from a 2D representation of a corresponding unfolded object.

FIG. 13 depicts an example procedure 1300 in which a shape of a 3D representation of a folded object is determined from a 2D representation of a corresponding unfolded object.

A graph representation is generated based on an analysis of detected visual cues of a 2D unfolded object representation (block 1302). In accordance with the principles discussed herein, the graph representation includes edges, vertices corresponding to intersections of the edges, regions that are each enclosed by a set of the edges, and holes. By way of example, the annotation module 204 generates the annotation data 208 as a graph representation of the 2D unfolded object representation 106. In this example, the annotation data 208's graph representation includes identified edges, vertices, regions, and holes. The annotation module 204 identifies these aspects based on an analysis of the visual cues of the 2D unfolded object representation 106, such as by identifying differences in stroke and style characteristics of the visual cues.

The edges are designated as fold lines or cut lines based on a topology of the graph and characteristics of the visual cues (block 1304). By way of example, the annotation module 204 designates the edges identified through the visual cue analysis at block 1302 as fold lines or cut lines based on a topology of the graph generated at block 1302 and the characteristics of the visual cues. These designations may be represented by the fold line data 210 and the cut line data 212 in one or more implementations.

Geometric correspondences of the graph representation are identified (block 1306). In accordance with the principles discussed herein, the correspondences include angle bisectors and edges having similar length. Further, the angle bisectors indicate the regions of the 2D unfolded object representation that correspond to tabs that are used to attach together the regions that correspond to panels. By way of example, object folding module 206 identifies geometric correspondences of the graph representation generated at block 1302, including angle bisectors and edges having similar length.

Vertex constraints are determined for each of the vertices based, at least in part, on designations of the edges intersecting at a respective vertex and the identified correspondences (block 1308). By way of example, the object folding module 206 determines vertex constraints for the vertices of the graph representation and based on the designations as fold lines or cut lines of block 1304.

An iterative process is then used after these steps are performed to determine a shape of the object. This process includes the following steps to determine a set of fold angles for every edge of the graph, and these steps are performed iteratively until the shape is produced. Fold angles are assigned to the edges proximate the vertices having zero degrees of freedom according to the determined vertex constraints (block 1310). By way of example, the object folding module 206 assigns fold angles to the edges that are proximate the graph representation's vertices having zero degrees of freedom according to the vertex constraints determined at block 1308.

The edges are identified where there is only one configuration in which the unfolded object is foldable to produce a shape (block 1312). By way of example, the object folding module 206 identifies the edges where there is only one configuration in which the unfolded object is foldable with the fold angles assigned at block 1310 to produce a shape.

The graph representation is updated by merging the vertices and the edges that are coincident in the shape in 3D when the unfolded object is folded at the identified edges according to the one configuration (block 1314). By way of example, the object folding module 206 updates the graph representation by merging the edges and vertices that are coincident in 3D when the unfolded object is folded at the edges identified at block 1312. Blocks 1310 through 1314 are repeated until fold angles are assigned to all of the edges. The shape is produced by folding the unfolded object according to the assigned fold angles.

Having described example procedures in accordance with one or more implementations, consider now an example system and device that can be utilized to implement the various techniques described herein.

Example System and Device

Figure 14:
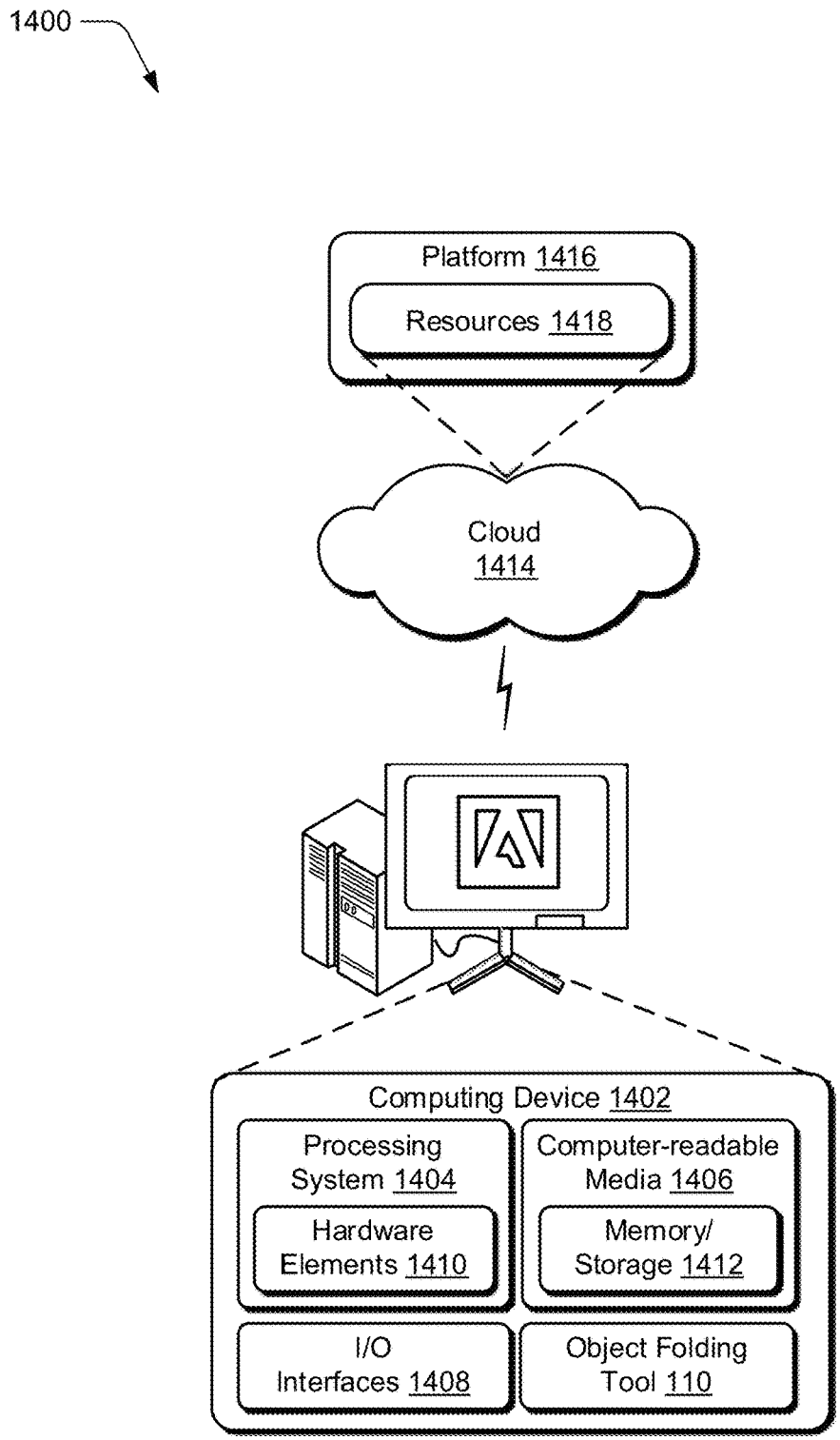
FIG. 14 illustrates an example system including various components of an example device that can be implemented as any type of computing device as described and/or utilized with reference to FIGS. 1-13 to implement embodiments of the techniques described herein.

FIG. 14 illustrates an example system generally at 1400 that includes an example computing device 1402 that is representative of one or more computing systems and/or devices that may implement the various techniques described herein. This is illustrated through inclusion of the object folding tool 110. The computing device 1402 may be, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that may be configured as processors, functional blocks, and so forth. This may include implementation in hardware as an application specific integrated circuit or other logic device formed using one or more semiconductors. The hardware elements 1410 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1406 is illustrated as including memory/storage 1412. The memory/storage 1412 represents memory/storage capacity associated with one or more computer-readable media. The memory/storage component 1412 may include volatile media (such as random access memory (RAM)) and/or nonvolatile media (such as read only memory (ROM), Flash memory, optical disks, magnetic disks, and so forth). The memory/storage component 1412 may include fixed media (e.g., RAM, ROM, a fixed hard drive, and so on) as well as removable media (e.g., Flash memory, a removable hard drive, an optical disc, and so forth). The computer-readable media 1406 may be configured in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1402. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1402, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1410. The computing device 1402 may be configured to implement particular instructions and/or functions corresponding to the software and/or hardware modules. Accordingly, implementation of a module that is executable by the computing device 1402 as software may be achieved at least partially in hardware, e.g., through use of computer-readable storage media and/or hardware elements 1410 of the processing system 1404. The instructions and/or functions may be executable/operable by one or more articles of manufacture (for example, one or more computing devices 1402 and/or processing systems 1404) to implement techniques, modules, and examples described herein.

The techniques described herein may be supported by various configurations of the computing device 1402 and are not limited to the specific examples of the techniques described herein. This functionality may also be implemented all or in part through use of a distributed system, such as over a "cloud" 1414 via a platform 1416 as described below.

The cloud 1414 includes and/or is representative of a platform 1416 for resources 1418. The platform 1416 abstracts underlying functionality of hardware (e.g., servers) and software resources of the cloud 1414. The resources 1418 may include applications and/or data that can be utilized while computer processing is executed on servers that are remote from the computing device 1402. Resources 1418 can also include services provided over the Internet and/or through a subscriber network, such as a cellular or Wi-Fi network.

The platform 1416 may abstract resources and functions to connect the computing device 1402 with other computing devices. The platform 1416 may also serve to abstract scaling of resources to provide a corresponding level of scale to encountered demand for the resources 1418 that are implemented via the platform 1416. Accordingly, in an interconnected device embodiment, implementation of functionality described herein may be distributed throughout the system 1400. For example, the functionality may be implemented in part on the computing device 1402 as well as via the platform 1416 that abstracts the functionality of the cloud 1414.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method for applying graphics to two-dimensional ("2D") and three-dimensional ("3D") representations of objects in an application, the method comprising:
   receiving, by an object folding tool of a computer application, a 2D representation of an unfolded object as input, the input 2D representation of the unfolded object including formatted lines having styling;
   detecting, by the object folding tool, the formatted lines on the input 2D representation of the unfolded object;
   determining, by the object folding tool, locations of transformations for transforming the unfolded object into a folded object based on locations of the formatted lines on the input 2D representation of the unfolded object;

determining, by the object folding tool, types of the transformations to perform at the locations based on the styling of the formatted lines, wherein the types of transformations include folds that are indicated by different styling of the formatted lines than other transformations;

identifying, by the object folding tool, fold lines on which the unfolded object is foldable to form the folded object based on the locations of the formatted lines and the different styling;

generating, by the object folding tool, annotations that describe the locations of the transformations and the types of transformations;

determining, by the object folding tool, a shape of the folded object by processing the annotations using an iterative technique, the iterative technique determining different fold angles at which to fold the unfolded object along a fold line of the fold lines, wherein:
  the different fold angles of the fold line produce different candidate shapes for the folded object;
  each different fold angle is determined based on the locations of the transformations and the types of transformations to perform at the locations as described by the annotations; and
  the shape of the folded object is selected from the different candidate shapes produced; and generating, by the object folding tool, a 3D representation of the folded object having the determined shape.

2. The method of claim 1, further comprising displaying the 2D representation of the unfolded object and the 3D representation of the folded object concurrently on a display device.

3. The method of claim 1, further comprising generating a file usable to cause at least one of:
  printing the unfolded object;
  cutting the unfolded object from a foldable material; or
  folding the unfolded object into the folded object.

4. The method of claim 1, further comprising:
  receiving a user input to apply a graphic to a portion of one of the 2D representation of the unfolded object or the 3D representation of the folded object;
  displaying application of the graphic to the portion; and
  concurrently displaying application of the graphic to a corresponding portion of the other of the 2D representation of the unfolded object or the 3D representation of the folded object.

5. The method of claim 4, further comprising determining a mapping between the 2D representation of the unfolded object and the 3D representation of the folded object, the concurrent display of graphic application being based on the mapping.

6. The method of claim 1, further comprising generating instructions to fold the unfolded object into the folded object.

7. The method of claim 1, wherein determining the different fold angles includes:
  identifying, based on the locations of the formatted lines and the different styling of the formatted lines, the fold lines and cut lines of the input 2D representation of the unfolded object;
  detecting vertices, the vertices corresponding to intersections of at least two of the fold lines and the cut lines;
  determining vertex constraints of the vertices; and
  iteratively assigning candidate fold angles to the fold lines and the cut lines that satisfy the vertex constraints.

8. The method of claim 1, wherein generating the 3D representation is based on folding the unfolded object along the fold lines at respective fold angles to form folds.

9. The method of claim 1, further comprising selecting one of the different candidate shapes as the shape of the folded object based on enclosed volumes of the different candidate shapes or open edges of the different candidate shapes.

10. The method of claim 1, further comprising:
  displaying the different candidate shapes via a user interface; and
  receiving user input to select one of the different candidate shapes as the shape of the folded object.

11. The method of claim 1, further comprising:
  determining an additional shape of the folded object; and
  displaying the 3D representation of the folded object having the additional shape.

12. A system comprising:
  an annotation module of an object folding tool to:
    detect visual cues of a 2D representation of an unfolded object received as input by the object folding tool, the input 2D representation of the unfolded object including formatted lines having styling;
    determine locations of transformations for transforming the unfolded object into a folded object based on locations of the formatted lines on the input 2D representation of the unfolded object;
    determine types of the transformations to perform at the locations based on the styling of the formatted lines, wherein the types of transformations include folds that are indicated by different styling of the formatted lines than other transformations;
    generate annotation data based on the formatted lines, the annotation data generated by identifying fold lines for transforming the unfolded object into the folded object based on the locations of the formatted lines and the different styling;
  an object folding module of the object folding tool to:
    determine different fold angles for a fold line of the fold lines, wherein the different fold angles of the fold line produce different candidate shapes of the folded object;
    determine a shape of the folded object by selecting one of the different candidate shapes as the shape; and
    generate a 3D representation of the folded object having the shape; and
  a display module to display the 2D representation of the unfolded object and the 3D representation of the folded object concurrently on a display device.

13. The system of claim 12, wherein the object folding module is further configured to determine the shape of the folded object iteratively based on bounds of motion of vertices indicated by the annotation data.

14. The system of claim 12, wherein the display module is further configured to display a 3D representation of a partially folded object, the partially folded object being a partial transformation of the unfolded object to the folded object.

15. The method of claim 1, further comprising analyzing the styling of the formatted lines to identify an additional style indicative of cut lines at which to cut the unfolded object to form the folded object.

16. The method of claim 1, wherein determining the shape further includes:

determining, based on enclosure by a set of identified fold lines and cut lines, regions of the 2D representation of the unfolded object; and designating each of the regions as a surface of the shape or a tab for connecting surfaces to form the shape.

17. The method of claim 1, wherein the styling of the formatted lines includes at least one additional style corresponding to at least one of glue lines or perforation lines of the 2D representation of the unfolded object.

18. Non-transitory computer-readable storage media storing instructions that are executable by one or more processors to perform operations for applying graphics to two-dimensional ("2D") and three-dimensional ("3D") representations of objects in an application, the operations including:

receiving, by an object folding tool of a computer application, a 2D representation of an unfolded object as input, the input 2D representation of the unfolded object including formatted lines having styling;

detecting, by the object folding tool, the formatted lines on the input 2D representation of the unfolded object;

determining, by the object folding tool, locations of transformations for transforming the unfolded object into a folded object based on locations of the formatted lines on the input 2D representation of the unfolded object;

determining, by the object folding tool, types of the transformations to perform at the locations based on the styling of the formatted lines, wherein the types of transformations include folds that are indicated by different styling of the formatted lines than other transformations;

identifying, by the object folding tool, fold lines on which the unfolded object is foldable to form the folded object based on the locations of the formatted lines and the different styling;

generating, by the object folding tool, annotations that describe the locations of the transformations and the types of transformations;

determining, by the object folding tool, a shape of the folded object by processing the annotations using an iterative technique, the iterative technique determining different fold angles at which to fold the unfolded object along a fold line of the fold lines, wherein:

the different fold angles of the fold line produce different candidate shapes for the folded object;

each different fold angle is determined based on the locations of the transformations and the types of transformations to perform at the locations as described by the annotations; and the shape of the folded object is selected from the different candidate shapes produced; and generating, by the object folding tool, a 3D representation of the folded object having the determined shape.

19. The computer-readable storage media of claim 18, wherein the operations further include displaying the 2D representation of the unfolded object and the 3D representation of the folded object concurrently on a display device.

20. The computer-readable storage media of claim 18, wherein the operations further include generating a file usable to cause at least one of:

printing the unfolded object;

cutting the unfolded object from a foldable material; or folding the unfolded object into the folded object.

* * * * *